US008616508B1

(12) United States Patent
Coleman

(10) Patent No.: US 8,616,508 B1
(45) Date of Patent: Dec. 31, 2013

(54) TRIPOD ADAPTER FOR HAND-HELD MOBILE MEDIA DEVICES

(76) Inventor: Jesse D. Coleman, San Francisco, CA (US)

(*) Notice: Subject to any disclaimer, the term of this patent is extended or adjusted under 35 U.S.C. 154(b) by 128 days.

(21) Appl. No.: 13/084,491

(22) Filed: Apr. 11, 2011

Related U.S. Application Data

(60) Provisional application No. 61/383,509, filed on Sep. 16, 2010.

(51) Int. Cl.
*F16M 11/00* (2006.01)
(52) U.S. Cl.
USPC ............... 248/176.1; 248/351; 248/178.1; 361/679.01
(58) Field of Classification Search
USPC ............ 248/176.1, 682, 688, 351, 291.1, 248/292.13, 292.14, 357, 177.1, 178.1, 248/917–923; 361/679.01, 679.3
See application file for complete search history.

(56) References Cited

U.S. PATENT DOCUMENTS

| | | | | | |
|---|---|---|---|---|---|
| 2,752,116 | A | * | 6/1956 | Minnis | 248/181.1 |
| 3,096,061 | A | * | 7/1963 | Bertell | 248/481 |
| 3,947,139 | A | * | 3/1976 | Feinbloom | 403/90 |
| 4,222,680 | A | * | 9/1980 | Browning | 403/56 |
| 4,473,177 | A | * | 9/1984 | Parandes | 224/191 |
| 4,872,630 | A | * | 10/1989 | Cooper | 248/278.1 |
| 5,086,958 | A | * | 2/1992 | Nagy | 224/544 |
| 5,513,784 | A | * | 5/1996 | Pretorius | 224/584 |
| 5,516,073 | A | * | 5/1996 | McMahan | 248/486 |
| 5,673,628 | A | * | 10/1997 | Boos | 108/44 |
| 5,769,369 | A | * | 6/1998 | Meinel | 248/176.1 |
| 5,810,313 | A | * | 9/1998 | Armstrong | 248/346.2 |
| 6,003,260 | A | * | 12/1999 | Chang | 40/748 |
| 6,062,518 | A | * | 5/2000 | Etue | 248/231.21 |
| 6,130,790 | A | * | 10/2000 | Tu | 359/841 |
| 6,328,270 | B1 | * | 12/2001 | Elberbaum | 248/288.31 |
| 6,336,672 | B2 | * | 1/2002 | Beaver | 296/97.9 |
| 6,366,672 | B1 | * | 4/2002 | Tsay | 379/446 |
| 6,585,201 | B1 | * | 7/2003 | Reed | 248/181.1 |
| 6,700,488 | B1 | * | 3/2004 | Leyden et al. | 340/568.1 |
| 7,246,781 | B2 | * | 7/2007 | Nam | 248/516 |
| 7,290,740 | B2 | * | 11/2007 | Joy et al. | 248/187.1 |
| 7,564,682 | B2 | * | 7/2009 | Liou et al. | 361/679.22 |
| 7,594,638 | B2 | * | 9/2009 | Chan et al. | 248/677 |
| 7,597,301 | B2 | * | 10/2009 | Seil et al. | 248/311.2 |
| 7,753,329 | B2 | * | 7/2010 | Hanson et al. | 248/278.1 |
| 7,770,862 | B2 | * | 8/2010 | Chen | 248/351 |

(Continued)

*Primary Examiner* — Terrell McKinnon
*Assistant Examiner* — Monica Millner
(74) *Attorney, Agent, or Firm* — Ray K. Shahani, Esq.; Kin Hung Lai

(57) ABSTRACT

A portable mobile media device adapter to enable secure and adjustable mounting of a mobile media device on a standard tripod or other supporting devices to allow hands-free viewing and operation of the mobile media device. The portable mobile media device adapter consists essentially of a snap-on shell portion; a flat tablet portion which has one flat surface and one decorated surface, the flat surface adhered to the outside surface of the snap-on shell portion, the decorated surface further has a surface aperture, one threaded nut further having a threaded through hole disposed permanently within the flat tablet portion; and an elongated kick stand assembly having a top end and a bottom end, the top end further has one horizontal threaded through hole and one matching threaded bolt wherein the matching threaded bolt fastens the top end to the threaded nut of the flat tablet portion, the bottom end further has an elongated bottom threaded bolt extending downwardly therefrom.

10 Claims, 9 Drawing Sheets

(56) References Cited

U.S. PATENT DOCUMENTS

| | | | |
|---|---|---|---|
| 7,836,623 B2* | 11/2010 | Wang et al. | 40/747 |
| 7,984,883 B2* | 7/2011 | Li et al. | 248/125.7 |
| 7,984,886 B2* | 7/2011 | Lin | 248/181.1 |
| 8,007,188 B2* | 8/2011 | Orf | 396/419 |
| 8,356,790 B2* | 1/2013 | Wu et al. | 248/688 |
| 8,366,064 B2* | 2/2013 | Chen et al. | 248/181.1 |
| 8,382,059 B2* | 2/2013 | Le Gette et al. | 248/460 |
| 8,480,044 B2* | 7/2013 | Liao | 248/205.8 |
| 2003/0156836 A1* | 8/2003 | Ward | 396/419 |
| 2004/0222340 A1* | 11/2004 | Richardson | 248/176.1 |
| 2007/0131825 A1* | 6/2007 | Skrodzki | 248/177.1 |
| 2007/0152117 A1* | 7/2007 | Byrd | 248/187.1 |
| 2009/0009936 A1* | 1/2009 | Neu et al. | 361/679 |
| 2009/0059481 A1* | 3/2009 | Taylor | 361/679 |
| 2010/0012809 A1* | 1/2010 | Zeng et al. | 248/351 |
| 2010/0224519 A1* | 9/2010 | Kao | 206/320 |

* cited by examiner

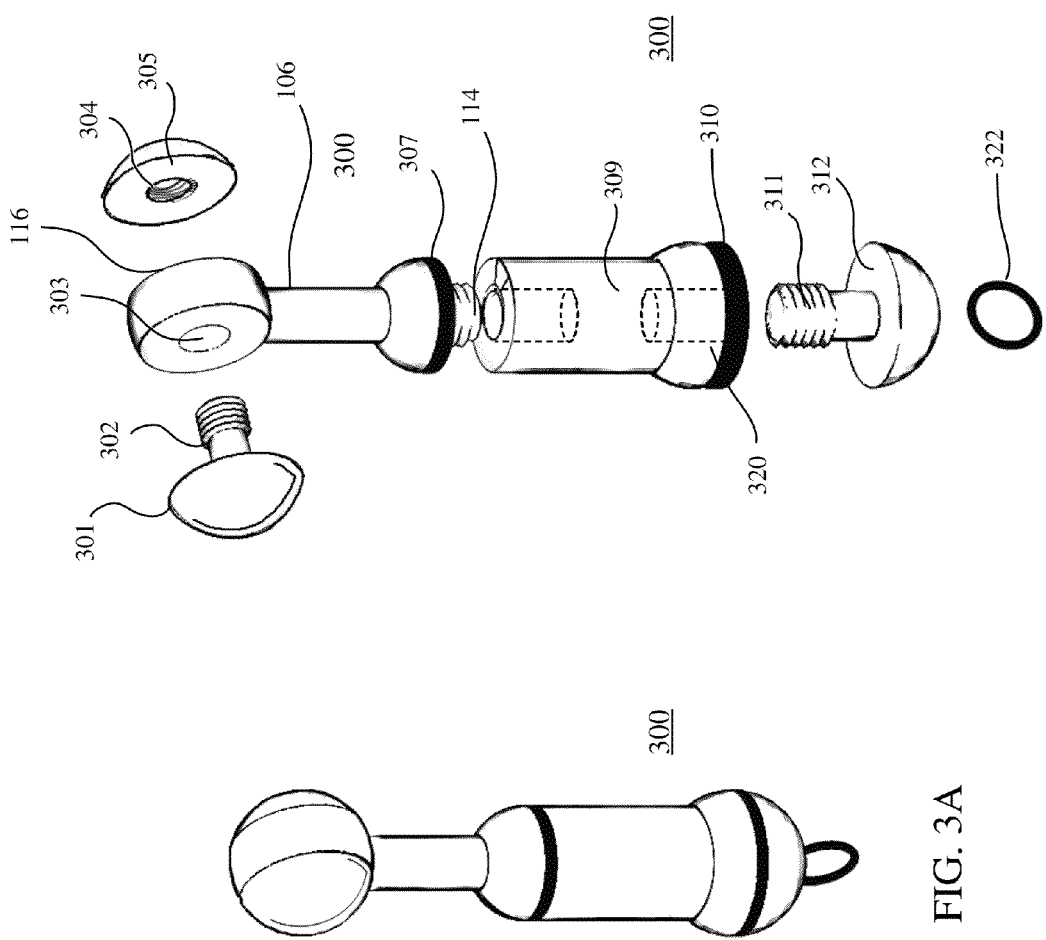

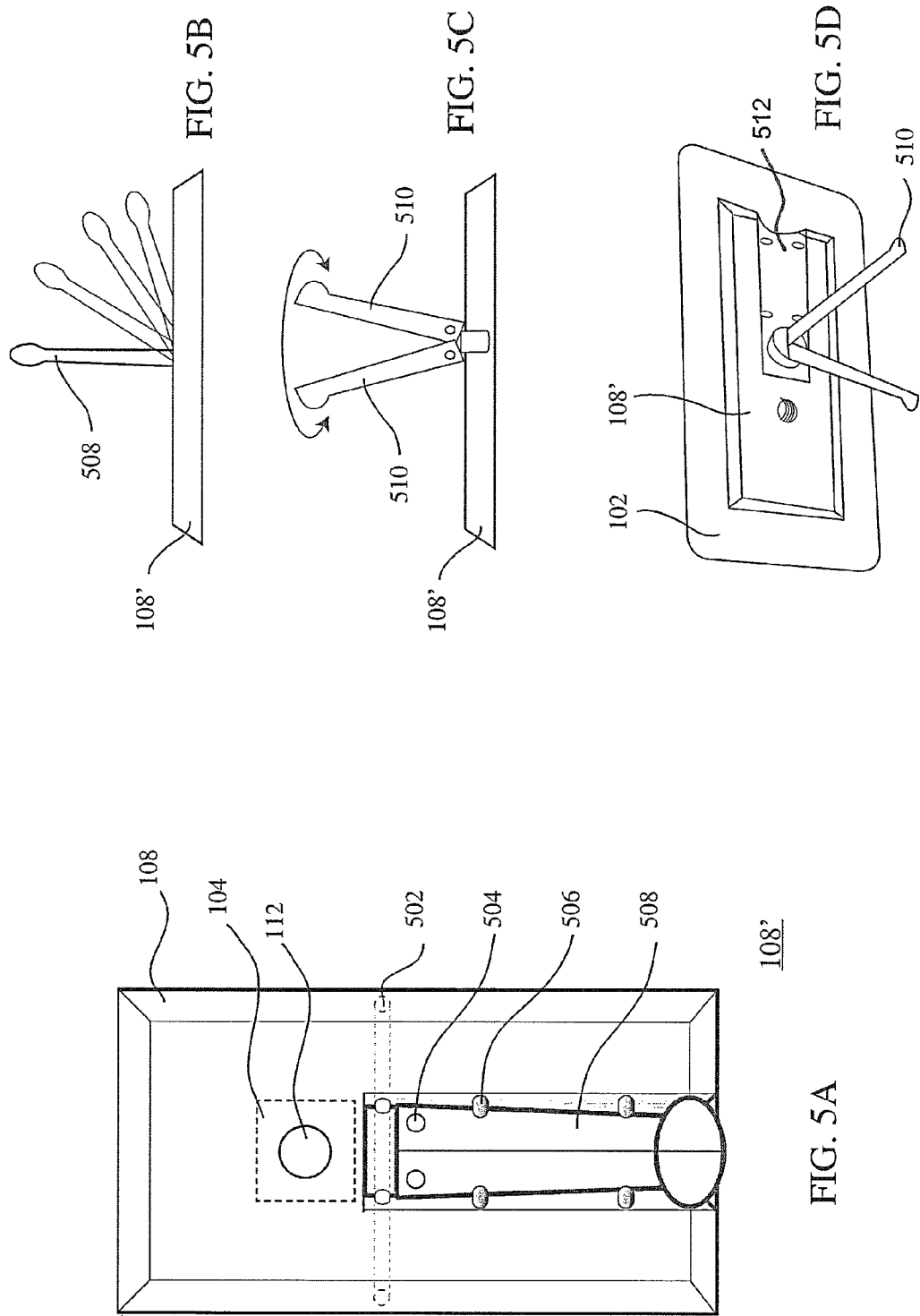

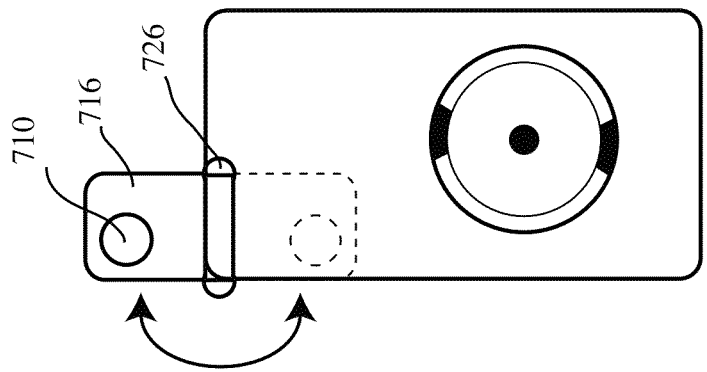
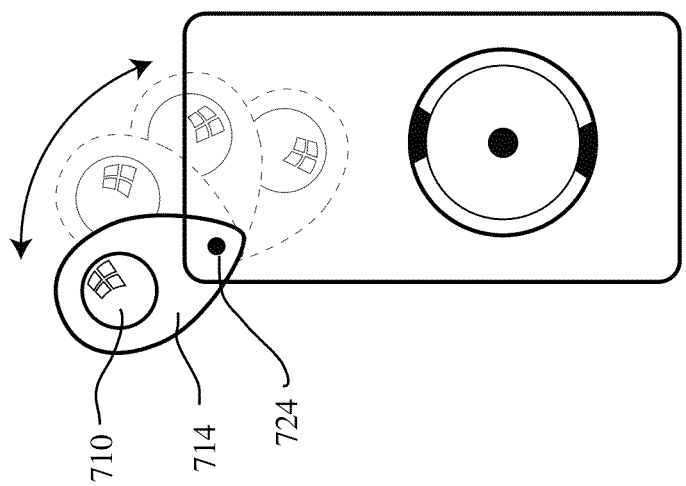
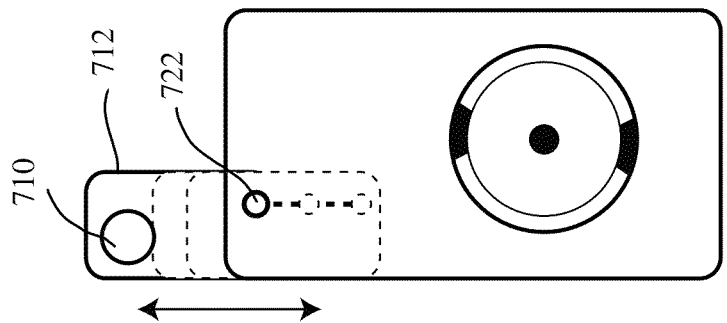

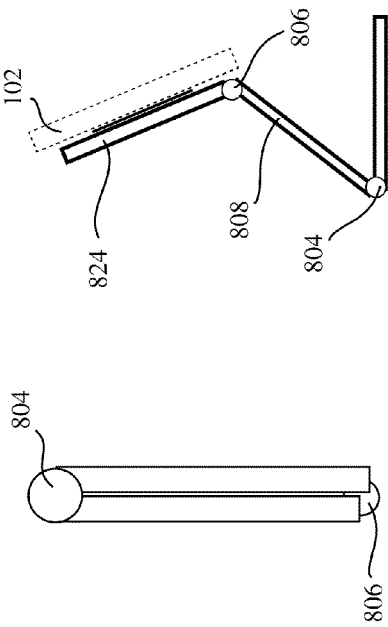
FIG. 8A  800
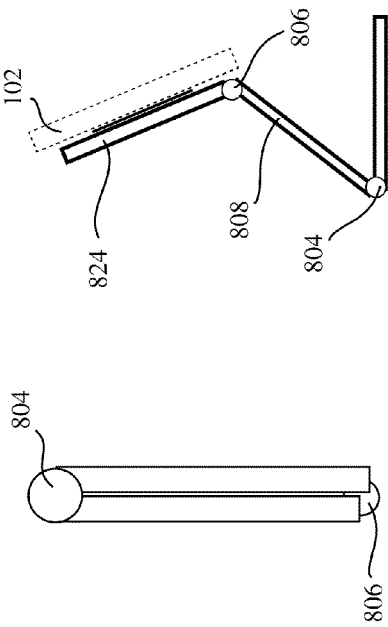
FRONT  FIG. 8B
FIG. 8C  SIDE, CLOSED
FIG. 8D  SIDE, OPEN
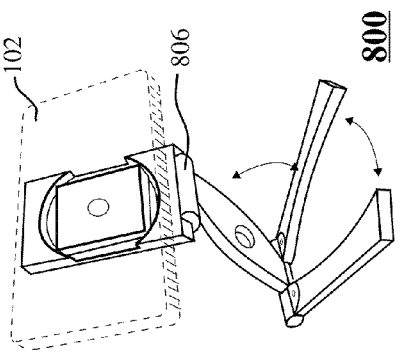
FIG. 8E
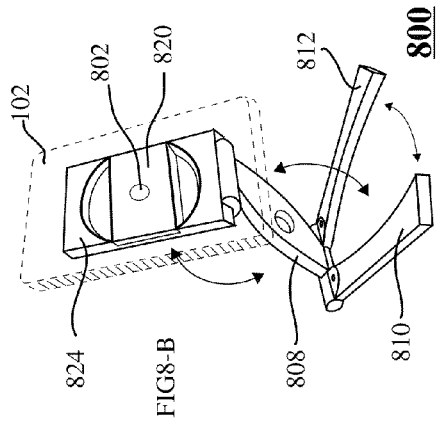
FIG. 8F  800

TRIPOD ADAPTER FOR HAND-HELD MOBILE MEDIA DEVICES

RELATED APPLICATIONS

This application is a Non-provisional application related to U.S. Provisional Patent Application Ser. No. 61/383,509 filed Sep. 16, 2010 entitled THE MOSY MOUNT ALLOWS YOU TO MOUNT ALMOST ANY HANDHELD TOUCH SCREEN DEVICE ONTO ALMOST ANY STANDARD TRIPOD; which is related to U.S. Provisional Patent Application Ser. No. 61/235,434 filed Aug. 20, 2009 entitled A PROTECTIVE COVER FOR iPHONE OR OTHER HANDHELD DEVICE THAT CAN BE MOUNTED TO A STANDARD TRIPOD, OR ANY DEVICE THAT INCLUDES A STANDARD ¼" MOUNTING BOLT, both of which are incorporated herein by reference in their entirety. This application claims any and all benefits to which it is entitled therefrom.

FIELD OF THE INVENTION

The present invention relates to a portable, temporary holding device for portable digital media devices such as the iPhone®, and more particularly to an adjustable tripod, kick stand and other peripheral components that stabilize and hold a media player in a secure, steady and adjustable position for easy hands free video recording, viewing and other usage. "iPhone" is a registered trademark of Apple Corporation.

BACKGROUND OF THE INVENTION

Mobile media devices featuring photograph and video taking/viewing functions such as the iPhone®, Droid (registered trademark of Motorola Corporation), etc., are becoming increasingly popular in today's market with thousands of videos and other files easily downloadable through the internet for rent or purchase. With mobile media device owners usually holding their media players with their own hands for lengthy periods of time to take and view these pictures and videos, there is a need for a portable device holder that allows users to view pictures, video or other files hands free, closer to one's face, and/or at an adjustable optimum viewing angle. Also, it is important to have hands-free operation for self driving automobiles, taking self portraits or other photograph/video taking occasions.

The present invention can be adapted to be used with any standard tripod and can be adapted to work with almost any model of hand held media device. The present invention, more specially, is a semi-rigid pad of polyurethane rubber or other plastic that is adhered to a semi-rigid shell that snaps onto the back of the hand held, optionally touch screen, media device. In one embodiment, it has a ¼"-20 square nut embedded, to allow it to be mounted on all standard tripod bolts, or any device or armature that features a ¼" bolt. This includes suction cups, straps, lanyards, mono-pods and or clamps.

Currently, there are several means by which you can mount a hand held touch screen media device onto a tripod but most are either large and or bulky. There are currently a limited variety of cases that can be attached to a standard tripod, many of them are only for the iPhone and can only be attached to a proprietary tripod. The products currently available use: (1) a proprietary mounting system that only works with a particular tripod that also may be too large for some applications, such as tabletop usage, (2) a fixed positioned mount to be used only on flat ground surfaces, (3) too small for some applications, such as outdoor panoramic or studio photography.

The present invention is made to supplement existing cases and/or be attached directly to the hand held media device. This concept is executed in a variety of designs and motifs that offer additional function and personalization of the hand held media device it is attached to. One of the designs allows the rubber or plastic mound to be trimmed to a smaller size without adversely affecting the overall look of the device.

The concept of the present invention and its rubber or plastic coupling mound offers universal usability, and user customization options. The rubber or plastic mound can be offered pre-applied to a case, or independently with a high bond adhesive pre-applied. This allows the user the choice of how and where it is applied.

Traditionally there are holders which allow users to insert media players. Their primary function is to either electrically charge the media player, provide a safety case, or provide a speaker base for listening to music. Although holders can be installed inside a moving vehicle, there are no dedicated portable media holders that allow either an iPod or an iPhone to be positioned hands free and attached to a tripod.

There are a variety of different holders for electronic devices that have been created over the past years such as the following listing:

| | Pat./Publication No. | Title: |
|---|---|---|
| 1. | 20070045495A1 | Mobile Device Clamp Holder With Damped Release Mechanism |
| 2. | 20060126824A1 | Electronic Device Holder |
| 3. | 20060126824A1 | Portable Electronic Device Clamp |
| 4. | 20040254002A1 | Clamping Device for Mobile Phones |
| 5. | 20020113185A1 | Holder For A Portable Electronic Device |
| 6. | 6366672 | Mobile Phone Holder |
| 7. | 6360083 | Clamping/Holding Device |
| 8. | 6085113 | Hand-free Holding Device For A Mobile Telephone Set II |
| 9. | 5903645 | Clamping Device For Mobile Phones |
| 10. | 5836563 | Mobile Phone Holder |
| 11. | 5825874 | Mobile Telephone Holder |
| 12. | 5703946 | Mobile Phone Holder |
| 13. | 5697071 | Mobile Phone Holder Structure |
| 14. | 5555302 | Mobile telephone Holder |

U.S. Pat. No. 6,366,672 issued Apr. 4, 2002, entitled, MOBILE PHONE HOLDER, describes a clamping mechanism for mobile phones which attaches to power outlets found inside vehicles. However, the invention only allows for certain limited horizontal and vertical movement, whereas, the present invention allows for much better positioning of the media player. The prior art is designed specifically to attach to the power outlet of a vehicle, and has no means of being secured to other surfaces, such as a lamp, a bedpost, a pole, an airplane tray table, etc., as in the present invention.

U.S. Publication No. 20060126824A1 published Sep. 28, 2006, entitled, ELECTRONIC DEVICE HOLDER, describes a clamping mechanism for an electronic device which allows for easy access to the controls of an electronic device. The prior art also includes a flexible arm to support the device and allows the prior art to stand on a flat surface. The prior art, however, does not allow it to be affixed to non-flat surfaces. The present invention, uses a bottom clamp specifically designed to firmly attach to a variety of different objects or surfaces rather than be confined to flat surfaces like the prior art. In addition securely clamping onto surfaces also provides further stability of the holder itself as compared to a stand resting on a flat surface.

U.S. Publication No. 20070045495A1 published Mar. 1, 2007, entitled, MOBILE DEVICE CLAMP HOLDER WITH DAMPED RELEASE MECHANISM, describes a clamping mechanism for a portable electronic devices where at least the first clamping jaw being displaceable toward the second clamping jaw to clamp the mobile electronic device. However, this prior art does not include an elongated flexible shaft which allows for optimum positioning of the mobile device. The prior art also does not include structure for securing the clamp portion to a solid surface, such as a lamp, a bedpost, a pole, an airplane tray table, etc., as found in the present invention.

ADVANTAGES AND SUMMARY OF INVENTION

The present invention is a holding and securing device that allows for hands free operation of portable media devices.

One object and advantage of the present invention is its portability providing the user with a hands free, adjustable operation experience for a wide variety of hand-held mobile media devices.

Another object and advantage of the present invention is to provide the user with a much improved operation experience as the present invention provides adjustability of the mobile media device both horizontally and vertically, and allows secure positioning of such mobile devices.

Another object and advantage of the present invention is its ability to attach quickly, easily and securely to a variety of tripods.

Yet another object and advantage of the present invention is its thin body, i.e., approximately ¼" thick, and possesses the ability to hold many different types of portable media devices and even some cellular phones.

Yet another object and advantage of the present invention is that it can stand up and maintain a secure position on virtually any surface.

Yet another object and advantage of the present invention is its portable size and foldable structure that makes for easy travel inside a user's pocket, handbag, backpack, briefcase or luggage when traveling.

Further details, objects and advantages of the present invention will become apparent through the following descriptions, and will be included and incorporated herein.

The invention possesses other objects and advantages especially as concerns particular characteristics and features thereof which will become apparent as the specification continues.

BRIEF DESCRIPTION OF THE DRAWINGS

FIG. 3A is a representative isometric view of the assembled apparatus 300 of the tripod adapter for hand-held mobile media devices 100 of the present invention.

FIG. 3B is a representative detail view of the assembled apparatus 300 of the tripod adapter for hand-held mobile media devices 100 of the present invention.

FIGS. 5A, 5B, 5C and 5D are representative top, side and isometric views of an alternative embodiment of plastic or rubber pad 108' of the tripod adapter for hand-held mobile media devices 100' of the present invention.

FIGS. 7A, 7B and 7C are representative top views of three alternative embodiments of plastic or other elastomeric pad with lens plate 702, 704 and 706.

FIGS. 8A, 8B, 8C and 8D are representative isometric view, top rear view, side view of a closed mode, side view of deployed mode of an alternative embodiment of the tripod adapter for hand-held mobile media devices 800 of the present invention.

FIGS. 8D, 8E and 8F are representative schematic views showing the method of use of an alternative embodiment of tripod adapter for hand-held mobile media devices 800 of the present invention.

For a better understanding of the invention reference is made to the following detailed description of the preferred embodiments thereof which should be considered in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1B:
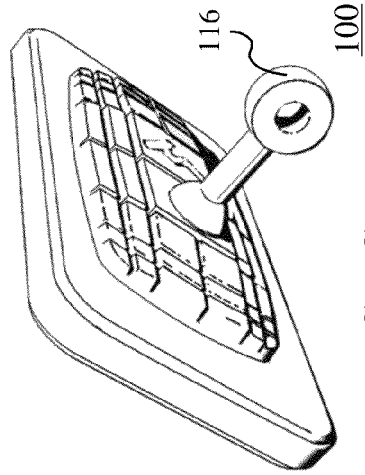
FIGS. 1B and 1C are representative schematic views of the method of use of tripod adapter for hand-held mobile media devices 100 of the present invention.
Figure 1C:
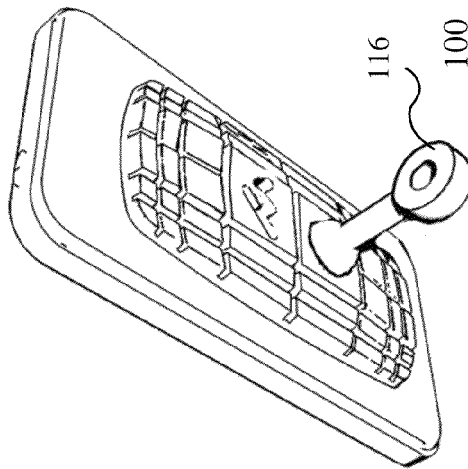
Figure 1A:
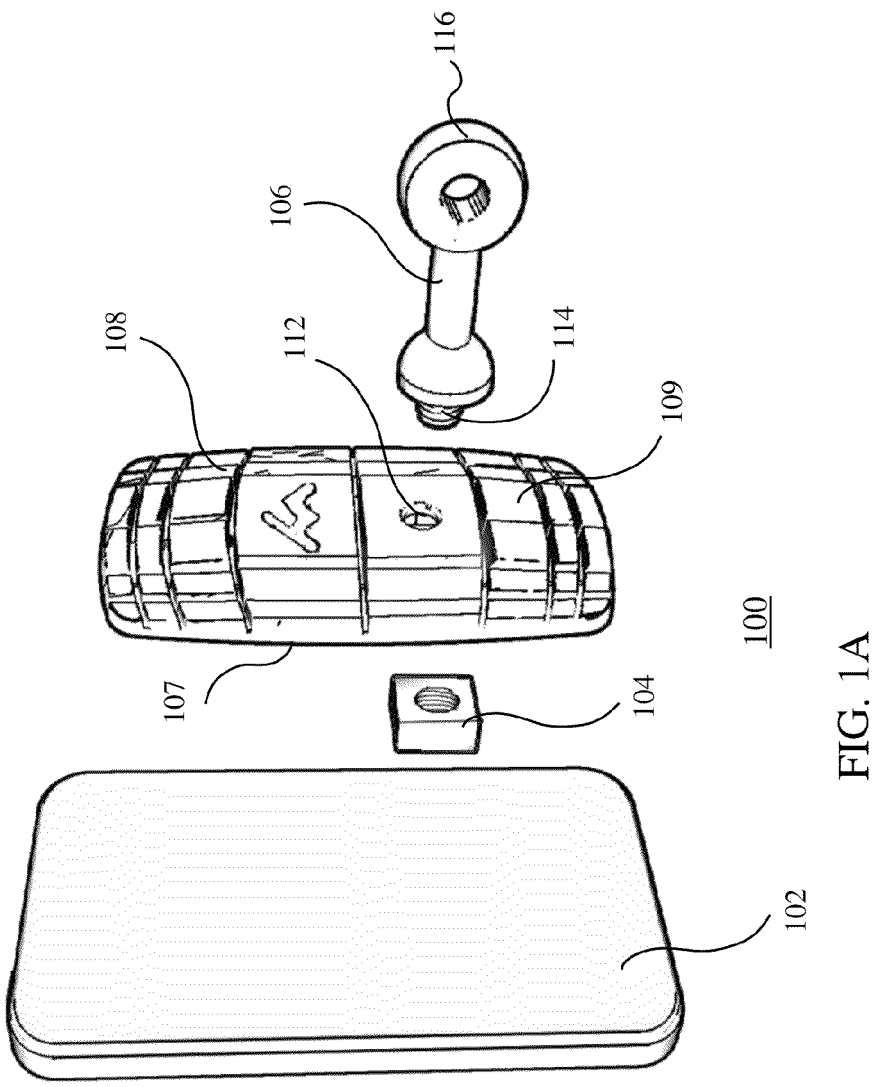
FIG. 1A is a representative isometric view of the tripod adapter for hand-held mobile media devices 100 of the present invention.

FIG. 1A is a representative isometric view of tripod adapter for hand-held mobile media devices 100 of the present invention. As shown in FIGS. 1A and 3A, the present invention 100 consists essentially of snap on case 102, plastic pad 108 and assembled apparatus 300. In one embodiment, snap on case 102 is a top open case that snaps onto and provides a snug but temporary hold for any mobile devices (not shown). Users can exchange snap on case 102 of different sizes to best suit their mobile devices' dimension. In one embodiment, there is camera aperture on snap on case 102 in order not to block the camera lens of mobile media devices (not shown).

In one embodiment, plastic pad 108 is the most essential portion of tripod adapter for hand-held mobile media devices 100 of the present invention. In one embodiment, plastic pad 108 accommodates a ¼"-20 TPI hex nut in the form of threaded nut or threaded brass insert 104. In an alternative embodiment, rubber pad 108 is manufactured by injection molding producing a single piece of rubber or plastic that includes the mound that allows a threaded hex nut or brass threaded insert to be embedded onto a snap on case 102.

As best shown in FIG. 1A, threaded nut or threaded brass insert 104 is embedded within plastic pad 108. In one embodiment, threaded nut or threaded brass insert 104 is a tablet having a threaded center through hole practically functioning as a ¼"-20 TPI hex nut. Plastic pad 108 is a flat structure having one flat surface 107 and one decorated surface 109. As shown in FIG. 1A, in one embodiment, plastic pad 108 has a tapered slot 112 that holds any ¼"-20 TPI bolt thumbscrew in place onto snap on case 102. Optionally, plastic pad 108 can be adhered either temporarily or permanently at the flat surface 107 to a mobile devices (not shown). Or alternatively, as best shown in FIG. 1A, plastic pad 108 can be adhered either temporarily or permanently at the flat surface 107 to snap on case 102 for more versatility.

Figure 2:
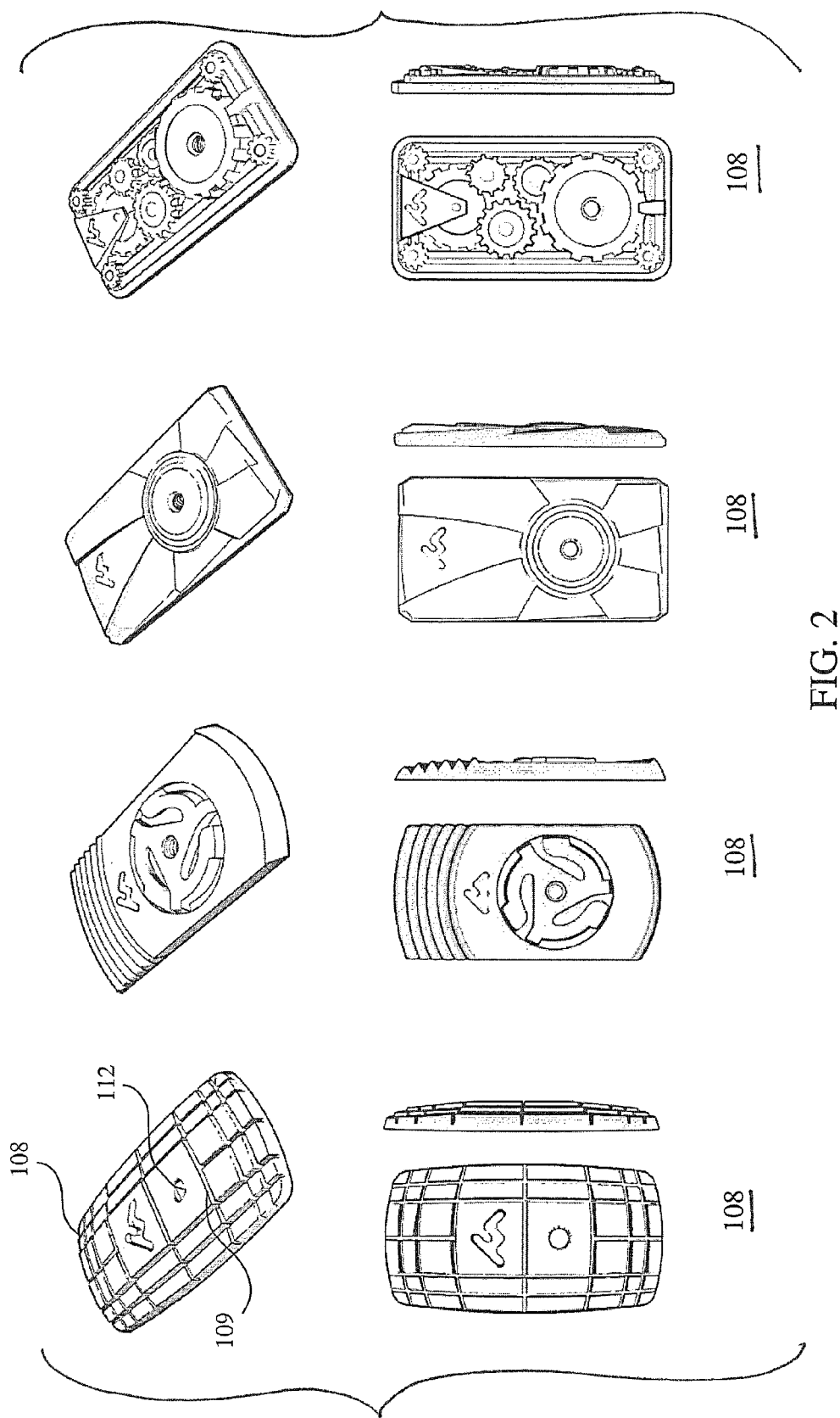
FIG. 2 is are representative views of four different design of plastic or rubber pad 108 of the tripod adapter for hand-held mobile media devices 100 of the present invention.

The key function of plastic pad 108 is to provide a secure method for the positioning of the threaded nut 104 to snap on case 102. Additionally, plastic pad 108 provides options for design aesthetics and marketing opportunities. FIG. 2 is are representative views of four different designs of plastic pad 108 of the tripod adapter for hand-held mobile media devices 100 of the present invention. As best shown in FIG. 2, plastic pad 108 can be decorated by using different molds, materials, colors. Additionally, decorated surface 109 provides the opportunities for engraving design elements and/or marketing messages.

FIGS. 1B and 1C are representative schematic views of the method of use of the tripod adapter for hand-held mobile media devices 100 of the present invention. As shown in FIGS. 1B and 1C, main stem 106, which is part of part of assembled apparatus 300, has one threaded end 114 which is a ¼"-20 TPI bolt and one anchor end 116. For simple angled elevation, users can simple fasten threaded end 114 to tapered slot 112 of plastic pad 108, snap on case 102 and media device (not shown) will be elevated at an angle either vertically or horizontally. This operation mode is especially useful for viewing of pictures, videos as the media device (not shown) is being held at a stable position on any flat surface. In alternative embodiments, with threaded nut or threaded brass insert 104 in place, tripod adapter for hand-held mobile media devices 100 can be adapted to be utilized with other various sized stationary platforms (not shown) utilizing extendable, retractable, bendable, or deformable appendices in effect to hold snap on case 102 and media device (not shown) in a stationary manner as long as those platforms have matching threaded end or bolt to tapered slot 112 of plastic pad 108. It will be understood that the mobile media device leans or rests on the tip or end 116 of the elongated stem portion 106.

FIG. 3A is a representative isometric view of assembled kick stand 300 of tripod adapter for hand-held mobile media devices 100 of the present invention. FIG. 3B is a representative detail view of assembled kick stand 300 of tripod adapter for hand-held mobile media devices 100 of the present invention. In one embodiment, assembled kick stand 300 consists top cap 301 attached integrally to ¼"-20 TPI threaded bolt 302, which both are made of plastic, rubber or aluminum; matching cap 305 which has ¼"-20 threaded insert; main stem 106; main barrel 309 and base cap 312 which has ¼"-20 threaded bolt 311 at one end. The main function of assembled kick stand apparatus 300 is to provide a secure connection between plastic pad 108 and any stationary horizontal platforms (not shown) in effect to hold snap on case 102 and media device (not shown) perpendicularly in a stationary manner as long as those platforms have matching threaded end or bolt to threaded nut or threaded brass insert 104 of plastic pad 108. As best shown in FIG. 3B, top cap 301 is threaded through threaded opening 303 of main stem 106 and subsequently to plastic pad 108 at tapered slot 112 to the embedded threaded nut or threaded brass insert 104. Subsequently, users can simple fasten threaded end 114 of main stem 106 to any supporting horizontal platform (not shown) that has a matching threaded hole, hence providing secure hold to plastic pad 108. Alternatively, in the event that supporting horizontal platform (not shown) has a matching threaded bolt instead, users can simply fasten the threaded end 114 of main stem portion 106 to the top end of main barrel 309 with optional rubber washer 307 in between. Subsequently, the bottom end of main barrel 309 which has an threaded insert hole 320 is fastened to any supporting horizontal platform (not shown) that has a matching threaded bolt, hence providing secure hold to plastic pad 108. There are two main functions for main barrel 309, one is to provide elevation to plastic pad 108 and eventually the entire tripod adapter for hand-held media devices 100 of the present invention. By switch to main barrel 309 of different lengths, users can control the level of elevation. The second function of main barrel 309 is to provide versatility to the present invention 100 to be used on different supporting horizontal platform (not shown). By switching to different main barrel 309 that has insert hole 320' of different threaded dimension and pattern, the present invention 100 can be fastened to a variety of supporting horizontal platforms (not shown) that have different connecting means or threaded bolts of various threaded dimension and pattern. In one embodiment, when assembled kick stand portion 300 is not in use, base cap 312 is fastened to main barrel 309. Optionally, there is a hoop 322 at the bottom end of base cap 312 for easy carrying.

Figure 4A:
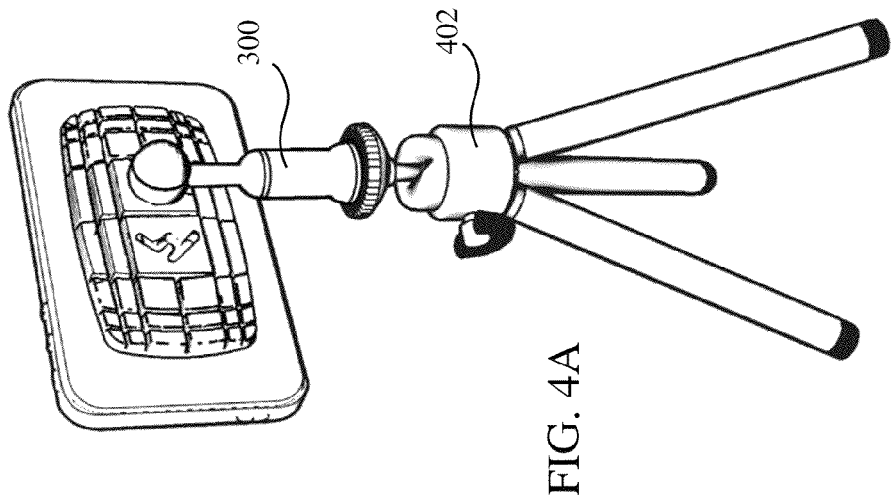
FIGS. 4A and 4B are representative schematic views showing the method of use of the tripod adapter for hand-held mobile media devices 100 of the present invention with a conventional tripod.
Figure 4B:
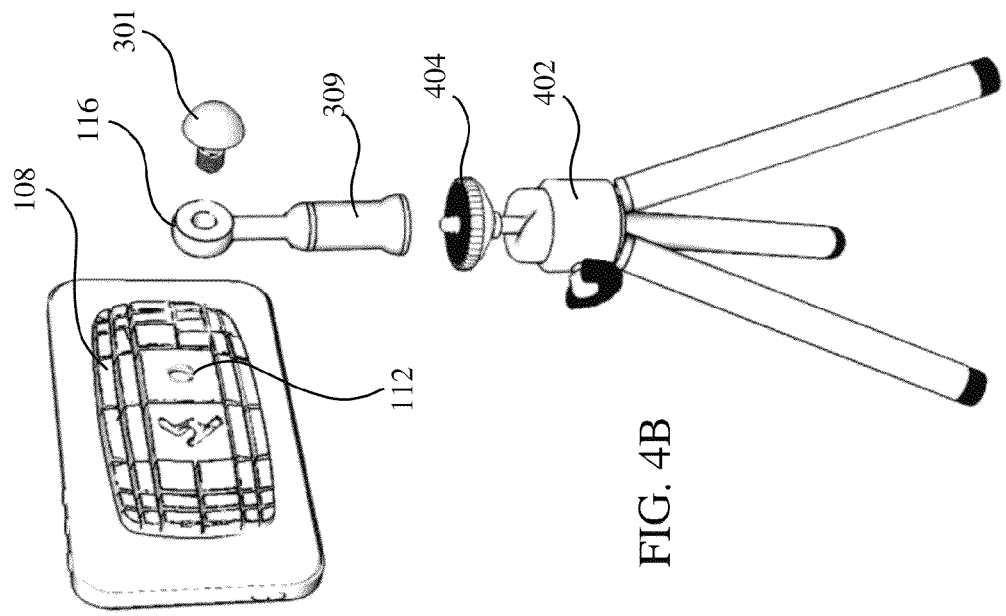

FIGS. 4A and 4B are representative schematic views showing the method of use of the tripod adapter for hand-held mobile media devices 100 of the present invention with a conventional tripod 402. As best shown, conventional tripod 402 has a horizontal platform that consists of ¼"-20 threaded bolt 404, matchingly to insert hole 320 of main barrel 309. In one embodiment, ¼"-20 threaded bolt 404 is fastened to main barrel 309 of assembled apparatus 300 erecting the entire present invention 100. Subsequently, ¼"-20 TPI threaded bolt 302 of top cap 301 is fastened to plastic pad 108 through threaded opening 303 of main stem 106 and tapered slot 112 of plastic pad 108, hence providing more stability, as well as providing a way to set the handheld device (not shown) in a position optimal for viewing content or using applications such as photo and video taking on the device (not shown). As mentioned, by switching to a different main barrel 309 that has insert hole 320' of various sizes and pattern, the present invention 100 can be mounted on any tripod or other supporting, holding devices.

FIGS. 5A, 5B, 5C and 5D are representative top, side and isometric views of an alternative embodiment of the plastic pad 108' of the tripod adapter for hand-held mobile media devices 100' of the present invention. In one alternative embodiment, the additional feature is the built in splitting kick stand 508. As shown in FIG. 5A, kick stand 505 further consists pivot pin 502, pivoting hinge 504 and splitting kick stand 508. In one embodiment, kick stand 505 has a default flat position, laying in a recessed groove 512 within the plastic pad 108. When it is not in use, nibs 506 are responsible to keep splitting kick stand 508 in place. Once the kick stand 508 is released from the nibs 506, it can split into two legs 510. The splitting of the kick stand 508 provides better stability when deployed, by offering a wider stance than offered by a single point of contact. As best shown in FIG. 5B, splitting kick stand 508 can provide angled elevation to plastic pad 108, resembling what is best shown in FIG. 1B. Additionally, users can separate splitting kick stand 508 into two legs 510. By rotating each leg 510 around its corresponding pivoting hinge 504, users can adjust the degree of elevation and angle.

Figure 6C:
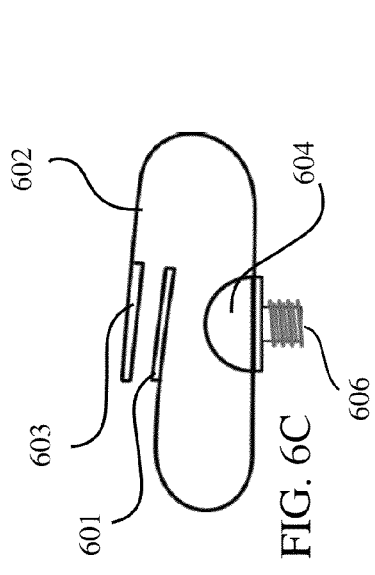
FIGS. 6A, 6B, 6C, 6D and 6E are representative schematic views of an alternative embodiment of assembled apparatus viz. a wrist/head band adapter 600 for the tripod adapter for hand-held mobile media devices 100" of the present invention.
Figure 6D:
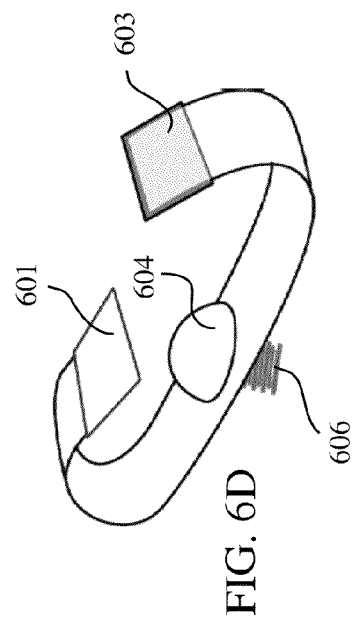
Figure 6A:
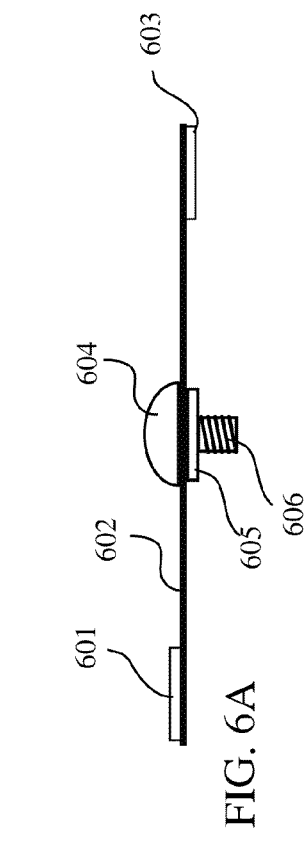
Figure 6B:
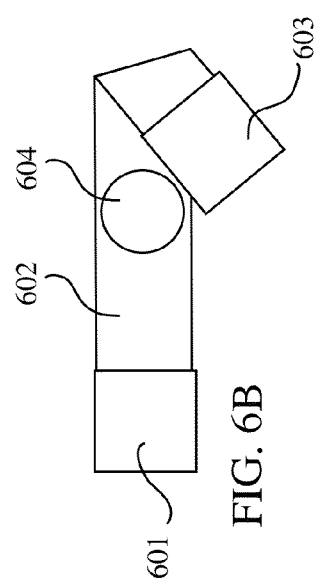
Figure 6E:
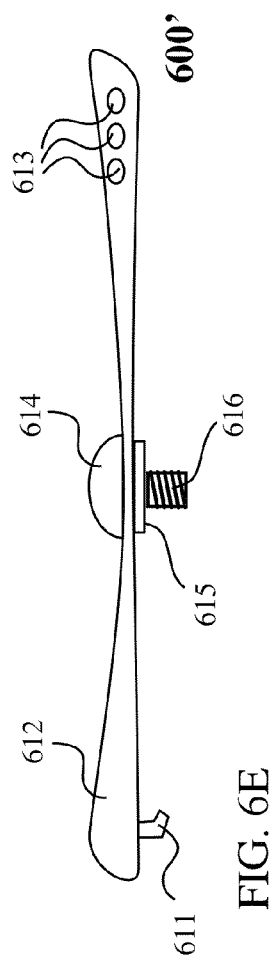

FIGS. 6A, 6B, 6C, 6D and 6E are representative schematic views of an alternative embodiment of assembled apparatus viz. a wrist/head band adapter 600 of the tripod adapter for hand-held mobile media devices 100" of the present invention. In one embodiment, wrist/head band adapter 600 consists of button cap 604 which further has ¼"-20 threaded bolt head 606, wrist/head band 602 which is a long strip of soft and elastic cloth-like material and two matching velcro patches 601 and 603. As best shown in FIG. 6A, ¼"-20 threaded bolt head 606 pierced through wrist/head band 602 and its position is secured by washer 605. As best shown in FIG. 6E, for headband adaptation of wrist/head band adapter 600', wrist/head band 602 is longer to adequately wrap around a regular person's head. In one alternative embodiment, instead of having two matching velcro patches 601 and 603 as closing means, hooked peg 611 and peg holes 613 can be adopted for adjustability.

Figure 6G:
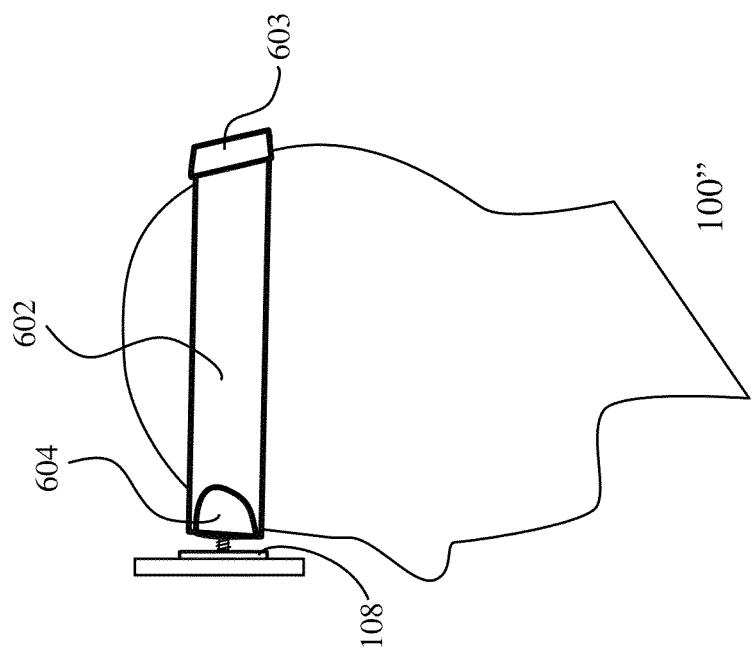
FIGS. 6F and 6G are representative schematic views of the method of use of the wrist/head band adapter 600 of the tripod adapter for hand-held mobile media devices 100" of the present invention.
Figure 6F:
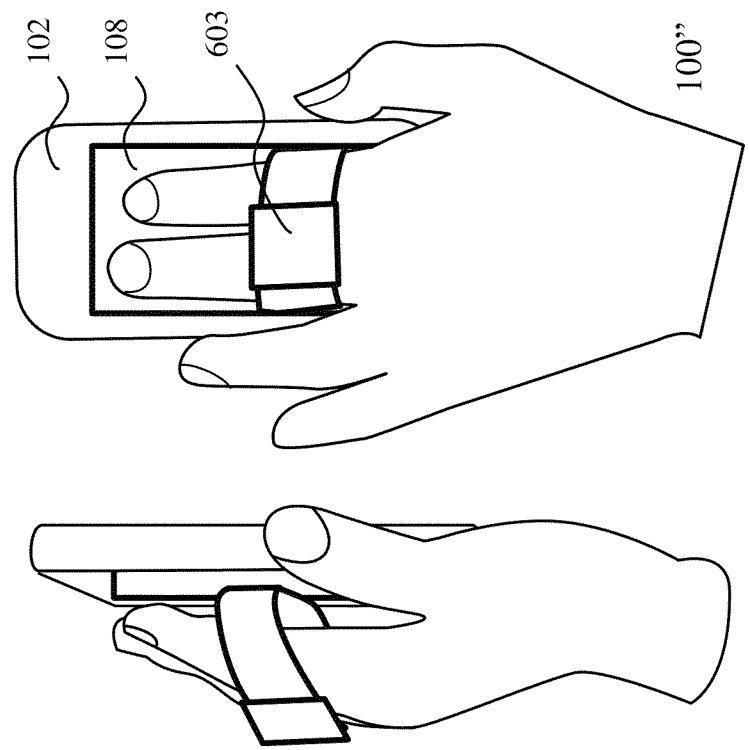

FIGS. 6F and 6G are representative schematic views of the method of use of the wrist/head band adapter 600 and 600' of the tripod adapter for hand-held mobile media devices 100" of the present invention. As best shown in FIG. 6G, users would fasten ¼"-20 threaded bolt head 606 of button cap 604 to the embedded threaded nut 104 of plastic pad 108 and then wear head band adapter 600' around their head, making the hand-held mobile media device (not shown) face forward. This set up is useful for photographic or video shooting to show a user's vantage point and perspective, or to broadcast an imge from the device to third parties visualizing or listening to the device worn by the user. As best shown in FIG. 6F, users can also wrap wrist band adapter 600 around their hand or palm, wrist or even a couple fingers for an easy and flexible operation mode when taking pictures or video or other applications.

FIGS. 7A, 7B and 7C are representative top views of three alternative embodiments of plastic pad with lens plate 702, 704 and 706. The main difference of the three alternative embodiments of plastic pad with lens plate 702, 704 and 706 to plastic pad 108 is the addition of a lens panel. As shown in FIG. 7A, lens plate 712 is installed at the corner of plastic pad 702. Optionally, lens plate 702 can be slid outward such that lens 710 will cover the camera of mobile media device (not shown). Lens 710 can be any type of optical lenses such as tinted lens, microscopic lens, etc. that provide additional options for users. Alternatively, as best shown in FIG. 7B, instead of a sliding panel, revolving lens plate 714 is pivoted at pivotal pin. In another alternative embodiment, as best shown in FIG. 7C, flipping lens plate 716 is pivoted at the edge of plastic pad with lens plate 706.

FIGS. 8A, 8B, 8C and 8D are representative isometric rear view, top rear view, side view of closed mode, side view of deployed mode of an alternative embodiment of tripod adapter for hand-held mobile media devices 800 of the present invention. The main additional function of this alternative embodiment 800 is to provide an adjustable angled elevation such that users can view or operate their mobile media devices (not shown) hands free. In one embodiment, an alternative embodiment of tripod adapter for hand-held mobile media devices 800 consists of plastic plate 824, body 808 and two bracing feet 810 and 812. As best shown in FIGS. 8E and 8F, plastic plate 824 is connected to body 808 by body pivot hinge 806. Plastic plate 824 is similar to plastic pad 108 but made of rigid plastic, and instead of embedded with threaded nut or threaded brass insert 104, contains, supports, and/or houses a rotating plate 820 which further has a ¼"-20 plate threaded hole 802. In one embodiment, plastic plate 824 is made of materials such as plastic which is rigid and stiff to provide the support required to hold the mobile media or computing device elevated as a tripod would. Optionally, plastic plate 820 can be adhered either temporarily or permanently to a mobile device (not shown) or to snap on case 102 for more versatility. The body 808 also has a matching ¼"-20 body threaded hole 820. As shown in FIG. 8A, when the alternative embodiment of the present invention 800 is closed, body threaded hole 820 aligns with plate threaded hole 802 on plastic plate 824 such that the alternative embodiment 800 functions exactly the same as plastic pad 108. As shown in FIG. 8D, body 808 is connected to two bracing feet 810 and 812 at two identical feet hinges 804.

FIGS. 8D, 8E and 8F are representative schematic views showing the method of use of an alternative embodiment of the tripod adapter for hand-held mobile media devices 800 of the present invention. As shown in FIGS. 8D, 8E, and 8F when alternative embodiment of tripod adapter for hand-held mobile media devices 800 is deployed, bracing feet 810 and 812 provide a stable stand for the entire embodiment 800. Users can adjust the positions of each bracing feet 810 and 812 at feet hinges 804 respectively. Users can also adjust viewing angle and elevation by adjusting body pivot hinge 806.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A portable mobile media device adapter to enable secure and adjustable mounting of a mobile media device on a standard tripod or other supporting devices to allow hands-free viewing and operation of the mobile media device, the portable mobile media device adapter comprising:

a flat tablet portion having one flat surface and one decorated surface, the decorated surface further having a surface aperture, one threaded nut further having a threaded through hole disposed permanently within the flat tablet portion, wherein the threaded through hole aligns with the surface aperture; and an elongated kick stand assembly having a top end and a bottom end, the top end further having one horizontal threaded through hole and one matching threaded bolt wherein the matching threaded bolt fastens the top end to the threaded nut of the flat tablet portion, fastening the elongated kick stand assembly flatly on the tablet portion, the bottom end further having an elongated bottom threaded bolt extending downwardly therefrom, wherein the bottom threaded bolt fastens the bottom end to the threaded nut of the flat tablet portion thereby removably coupling the elongated kick stand assembly perpendicular to the tablet portion, the kick stand assembly further having an elongated extended body, the extended body further having a top end and a bottom end, the top end having a threaded hole matching the bottom threaded bolt on the kick stand assembly, the bottom end having a bottom threaded hole matching the threaded bolt of the top end of the kick stand assembly, wherein the bottom threaded hole of the extended body removably couples the portable mobile media device adapter to a tripod or any other mounting surface having a matching threaded bolt such that the portable media device holder is oriented perpendicular to the mounting surface when the bottom threaded hole of the extended body portion is coupled to the tripod or other mounting surface.

2. The portable mobile media device adapter of claim 1 in which the bottom threaded bolt of the kick stand assembly erects and secures the position of the portable mobile media device adapter on any surface having a matching threaded hole.

3. The portable mobile media device adapter of claim 1 in which the bottom panel of the snap-on shell further has an aperture, the aperture positioned and sized to avoid visual interference with a camera lens on the mobile media device.

4. The portable mobile media device adapter of claim 1 in which the kick stand assembly further has an elongated extended body, the extended body further having a top end and a bottom end, the top end having a threaded hole matching the threaded bolt on the adapter assembly, the bottom end having a bottom threaded hole.

5. The portable mobile media device adapter of claim 4 in which the bottom threaded hole of the extended body erects and secures a position of the portable mobile media device adapter on a tripod and any surface having a matching threaded bolt.

6. The portable mobile media device adapter of claim 1 in which the flat tablet portion is constructed of rubber, silicon or plastic.

7. The portable mobile media device adapter of claim 1 in which the flat tablet portion further has a kick stand which springs outward, the kick stand connected to the flat tablet portion at a spring hinge.

8. The portable mobile media device adapter of claim 1 in which the bottom threaded bolt of the kick stand assembly fastens to the threaded through hole of the threaded nut, wherein the mobile media device elevates at an angle on any surface.

9. The portable mobile media device adapter of claim 1 in which the snap-on shell portion further has a through hole, positioned and sized correspondingly to the camera lens of the mobile media device.

10. The portable mobile media device adapter of claim 9 in which the flat tablet portion further has a lens panel attached by flexible mechanical means, the lens panel further has an optical lens installed, the lens panel deployed manually, wherein the optical lens covers the camera lens of the mobile media device.

* * * * *